(12) United States Patent
Rincón et al.

(10) Patent No.: US 6,512,448 B1
(45) Date of Patent: Jan. 28, 2003

(54) MULTILINGUAL WIRELESS MESSAGING SYSTEM

(75) Inventors: Jorge A. Rincón, Miami, FL (US); Isabelle Laeyendecker, Coral Gables, FL (US); Zdenek Spacek, Bay Harbor Islands, FL (US)

(73) Assignee: StarMedia Network, Inc., New York, NY (US)

( * ) Notice: Subject to any disclaimer, the term of this patent is extended or adjusted under 35 U.S.C. 154(b) by 0 days.

(21) Appl. No.: 09/290,758

(22) Filed: Apr. 13, 1999

(51) Int. Cl.$^7$ ................................................. H04O 1/00
(52) U.S. Cl. ................... 340/7.51; 455/466; 379/93.01; 340/7.56
(58) Field of Search ............................... 340/7.51, 7.29, 340/7.24, 732, 7.53; 379/93.01; 455/466

(56) References Cited

U.S. PATENT DOCUMENTS

| | | | | |
|---|---|---|---|---|
| 4,365,315 A | * | 12/1982 | Jamnik | 704/8 |
| 4,870,402 A | * | 9/1989 | DeLuca et al. | 340/7.51 |
| 5,223,831 A | * | 6/1993 | Kung et al. | 340/825.44 |
| 5,604,492 A | * | 2/1997 | Abdul-Halim | 340/7.53 |
| 5,635,918 A | * | 6/1997 | Tett | 340/825.52 |
| 5,784,001 A | * | 7/1998 | DeLuca et al. | 340/825.44 |
| 6,192,218 B1 | * | 2/2001 | Laufmann et al. | 455/31.2 |
| 6,205,322 B1 | * | 3/2001 | Muramatsu | 340/7.53 |

* cited by examiner

Primary Examiner—Brian Zimmerman
(74) Attorney, Agent, or Firm—Hughes Hubbard & Reed LLP; Ronald Abramson; Peter A. Sullivan

(57) ABSTRACT

A multilingual character conversion system for alphanumeric communications comprises an input unit, provisioning database, translation unit and output unit. The provisioning database contains informtion about the recipient messaging device and associations for a plurality of output character sets. The translation unit converts the incoming message to the form in which the message can be displayed on the recipient device.

5 Claims, 8 Drawing Sheets

| INPUT / OUTPUT | ALPHA | BETA | GAMMA | DELTA | EPSILON |
|---|---|---|---|---|---|
| ALPHA | 50, 56 | 50, 57 | 50, 58 | 50, 59 | 50, 60 |
| BETA | 51, 56 | 51, 57 | 51, 58 | 51, 59 | 51, 60 |
| GAMMA | 52, 56 | 52, 57 | 52, 58 | 52, 59 | 52, 60 |
| DELTA | 53, 56 | 53, 57 | 53, 58 | 53, 59 | 53, 60 |
| EPSILON | 54, 56 | 54, 57 | 54, 58 | 54, 59 | 54, 60 |

FIG. 5

| INPUT | OUTPUT | INPUT | OUTPUT |
|---|---|---|---|
| THAI | ASCII | THAI | ASCII |
| ๐ | 0 | ๕ | 5 |
| ๑ | 1 | ๖ | 6 |
| ๒ | 2 | ๗ | 7 |
| ๓ | 3 | ๘ | 8 |
| ๔ | 4 | ๙ | 9 |

FIG. 6

INPUT   OUTPUT

| | | |
|---|---|---|
| Ģ | G | (LATVIAN, LAPPISH)<br>LATIN CAPITAL LETTER G WITH CEDILLA |
| 'n | n | (AFRIKAANS)<br>LATIN SMALL LETTER N PRECEDED BY APOSTROPHE |
| ň | n | (CZECH, SLOVAK)<br>LATIN SMALL LETTER N WITH CARON |
| Ŧ | T | (LAPPISH)<br>LATIN CAPITAL LETTER T WITH STROKE |
| ŵ | w | (WELSH)<br>LATIN SMALL LETTER W WITH CIRCUMFLEX |
| Ĝ | G | (ESPERANTO)<br>LATIN CAPITAL LETTER G WITH CIRCUMFLEX |
| Å | A | (DANISH, NORWEGIAN, SWEDISH)<br>LATIN CAPITAL LETTER A WITH RING ABOVE |
| Ǿ | O | LATIN CAPITAL LETTER O WITH STROKE AND ACUTE |
| Χ | X | GREEK CAPITAL LETTER CHI |
| К | K | CYRILLIC CAPITAL LETTER KA |
| у | Y | CYRILLIC CAPITAL LETTER U |
| п | n | CYRILLIC SMALL LETTER PE |
| ƒ | f | (FLORIN CURRENCY SYMBOL - DUTCH)<br>LATIN SMALL LETTER F WITH HOOK |

FIG. 7

INPUT    OUTPUT

| Input | Output | Description |
|---|---|---|
| 'n | '+n | (AFRIKAANS) LATIN SMALL LETTER N PRECEDED BY APOSTROPHE |
| Pts | P+t+s | PESETA SIGN |
| № | N+° | NUMERO SIGN |
| « | <+< | LEFT-POINTING DOUBLE ANGLE QUOTATION MARK |
| TM | T+M | TRADEMARK SIGN |
| ‰ | %+O | PER MILLE SIGN |
| … | .+.+. | HORIZONTAL ELLIPSIS |
| ¾ | 3+/+4 | VULGAR FRACTION THREE QUARTERS |
| Œ | O+E | (FRENCH, IPA,...) LATIN CAPITAL LIGATURE OE |
| © | (+c+) | COPYRIGHT SIGN |
| Dž | D+z | (CROATIAN, DIGRAPHS MATCHING SERBIAN CYRILLIC LETTERS) LATIN CAPITAL LETTER D WITH SMALL LETTER Z WITH CARON |
| ij | i+j | (DUTCH) LATIN SMALL LIGATURE IJ |
| ± | ++/+- | PLUS - MINUS SIGN |

FIG. 8

MULTILINGUAL WIRELESS MESSAGING SYSTEM

FIELD OF INVENTION

The present invention relates generally to telecommunications, and more particularly, the present invention relates to a character conversion system for electronic alphanumeric messages.

BACKGROUND OF THE INVENTION

In the past alphanumeric paging was typically conducted on a local level wherein ratio transmissions of paging information had a limited range. However, current advances in long-distance telephone service and satellite communications now permit users to send alphanumeric messages world-wide from a variety of electronic source devices to a variety of electronic recipient devices. The devices may include electronic mail ("email"), HTML forms on a website, mobile telephones, one and two-way pagers, fax machines and other electronic devices.

A relatively new problem has surfaced arising from incompatible character sets. It is desirable to many manufacturers of electronic devices to make them as small as possible. This is particularly true of alphanumeric pagers, cellular phones and other portable communication devices. As a result, manufacturers must limit the memory capacity of the devices for both size and product costs. Alphanumeric devices displaying words and numbers use a predefined matrix of characters called a character set. Different makes and models of electronic devices contain differing character sets. For example, pagers for use in an English speaking country will unlikely contain a character set for the Thai language and vice-versm. Therefore, even if the recipient user could have understood a message sent from an English-character set pager, her Thai-character set pager could not interpret the characters.

The problem also arises from the use of the Internet to send messages. An undeniable benefit of the World Wide Web is its standardized protocols (HTML and HTTP) which provide compatibility from a plurality of operating systems and browser software. Many paging services provide the capability to send an alphanumeric message using an HTML form. When characters are posted through the HTML form, they must be converted to hexadecimal form before being relayed to the wireless electronic device. However, without a novel translation process, the character sets of the operating system, web browser, language and recipient hardware may prove incompatible resulting in a message of gibberish. Accordingly, an object of this invention is to provide alphanumeric character translation between electronic devices having differing characters sets and particularly for wireless alphanumeric messages sent through the Internet.

Previous attempts have been made to provide character translation such as described in U.S. Pat. No. 5,784,001 to DeLuca et at. (the '001 patent) and U.S. Pat. No. 4,870,402 to DeLuca et al. (the '402 patent); all of which are incorporated herein by reference. U.S. Pat. No. 5,784,001 to DeLuca et al. (the '001 patent) describes a method and apparatus for presenting graphic messages in a receiver comprising a data communications receiver for receiving a message including at least one code, a database for storing codes and image data associated with the codes, and a presentation element for locating at least one code in the database. The presentation element then retrieves the image data associated with at least one code. The image data associated with at least one code is representative of at least one image. The data communications receiver also includes a display coupled to the presentation element for presenting at least one image as a graphic message. The perceived benefit of using the icon-based system is that a user who speaks a particular language is able to understand received messages transmitted in a different language. However, the icon-based system is inferior to a true language communication and is often unsuitable for many purposes.

U.S. Pat. No, 4,870,402 to DeLuca et al. (the '402 patent) describes a multilingual paging system whereby a control character is sent in a radio frequency page transmission to indicate the information contains alphabetic or ideographic characters in an alternate language. Should an alternate language be identified, a predetermined number is added to the hexadecimal value of the initial character to shift to the alternate language character set. An optional alternate language comprised of additional characters is shown whereby the control character for the optional alternate language is an alternate key bit configuration. Therefore, to activate the receiver's microprocessor to select the optional characters, the keyboard enters an alternate key followed by the key representing the optional character to be transmitted. However, the '402 patent does not provide a system that maps equivalent characters, characters with similar appearances, or compound characters when the recipient alphanumeric device does not support the character set of the source device. In addition, the '402 patent does not provide a character set translation for Internet-based communication that maps characters from differing operating systems and web browser software.

Consequently, there is a need in the art for an alphanumeric character translation system that determines if an alphanumeric character sent by the source is unavailable by the recipient device and intelligently maps the original source character with a character of similar meaning that is supported by the recipient device.

There is a further need in the art for an alphanumeric character translation system that determines if an alphanumeric character sent by the source is unavailable by the recipient device and intelligently maps the original source character with a character of similar appearance that is supported by the recipient device.

There is a further need in the art for an alphanumeric character translation system that determines if an alphanumeric character sent by the source is unavailable by the recipient device and intelligently maps the original source character with a plurality of characters supported by the recipient device which, taken together, provide a similar meaning or appearance.

There is a further need in the art for an alphanumeric character translation system for Internet-based messaging that identifies the source operating system, web browser software, language desired and recipient device to seamlessly transmit text messages from an HTML form to a wireless device

SUMMARY OF THE INVENTION

The present invention solves significant problems in the art by providing a multilingual wireless messaging system that seamlessly maps incompatible characters from a web browser form to characters supported by a recipient wireless device. The above and other objects of the invention are achieved in the embodiments described herein by novel use of a character decoding table comprising mapping information on various operating systems, web browser software, languages and wireless messaging devices.

Generally described, the present invention provides a method of decoding characters over a wireless network wherein a packet of information entered into a web browser comprising an alphanumeric message and a destination hardware specification is received by the system. The system then identifies the operating system used to transmit the alphanumeric message. In a preferred embodiment, the is system will detect a plurality of the most popular operating systems including Windows NT, Windows 98, Windows 95, Apple Macintosh, unix, Linux, and any other supported operating systems. The system then identifies the web browser software used to transmit said alphanumeric message which may include Microsoft Internet Explorer, Netscape Navigator, or any other regularly used browsing software. The system then determines the source language of said alphanumeric message such as English, Chinese, French, Spanish, Japanese or the like. The system must also identify a recipient wireless device corresponding to the destintion hardware specification. This is preferably accomplished using an HTML form with the most popular makes and models of wireless cellular phones, pagers and other wireless devices that will accept alphanumeric messages.

The operating system, web browser software, source language and recipient wireless device information is then referenced against a character decoding table. The character decoding table comprises a large matrix of character conversion data for each operating system, web browsing software, language and recipient wireless device. Each character is mapped through the matrix to resolve an equivalent character supported by the recipient device. After the body of the message is mapped through the matrix, the mapped message is then transmitted to the recipient wireless device utilizing characters supported by the recipient wireless device. The entire process is seamless to the end user entering the message from the web browser.

Where the recipient wireless device does not support the original character entered into the web browser, a number of techniques are used to transmit a readable equivalent. Upon finding no exact character match in the character decoding table, the system substitutes a near-match character that is visually similar in appearance to the original character entered into the web browser. For example, a Latin capital letter "A" with a ring above ("Å") may not be supported by the recipient wireless device. In that case, the Latin character "Å" would be mapped to a regular "A" supported by the wireless device.

In other cases, an equivalent character, even though visually distinct, may be substituted during the character mapping. For example, Thai characters used for numbers may not be suppotted by the recipient wireless device. It may be acceptable to utilize ASCII digits 0,1,2,3,4,5,6,7,8 and 9 as substitute as they are generally well known, even to recipient users only versed in the Thai language.

There are also occasions wherein the recipient wireless device does not support a single character equivalent, but may communicate the equivalent through a plurality of support characters, or what is referred to as a compound character. For example, the © symbol may not be supported by the recipient wireless device. However, a lowercase letter "c" enclosed by parentheses ("(c)") may be considered equivalent. These conversion rules are delineated in the character decoding table, and the process is seamless and unobtrusive to either the web browser user or the user of the recipient device.

Finally, there are times where absolutely no equivalent character mapping may be achieved. In a preferred embodiment, signals are transmitted to the sender of the message to indicate a compatibility error.

Accordingly, it is an object of the present invention to provide seamless Internet-based wireless messaging without regard to operating systems, web browsing software, languages or wireless device hardware.

It is another object of the present invention to provide sophisticated character mapping where exact character equivalents are unsupported by the recipient wireless device hardware.

An advantage of the invention is that updates, changes, new hardware specifications and other data resides on the multilingual messaging server, providing a seamless resource of the wireless messaging system to the end user, without requiring downloads, updates, or patches on the user end.

BRIEF DESCRIPTION OF THE DRAWINGS

FIG. 5 is a translation matrix of conversion routines as utilized according to the invention.

FIG. 6 is a table view of an enhanced character mapping with similar meaning according to the invention.

FIG. 7 is a table view of an enhanced character mapping with similar look according to the invention.

FIG. 8 is a table view of an enhanced character mapping with one-to many character translation according to the invention.

DETAILED DESCRIPTION OF THE PREFERRED EMBODIMENT

Figure 1:
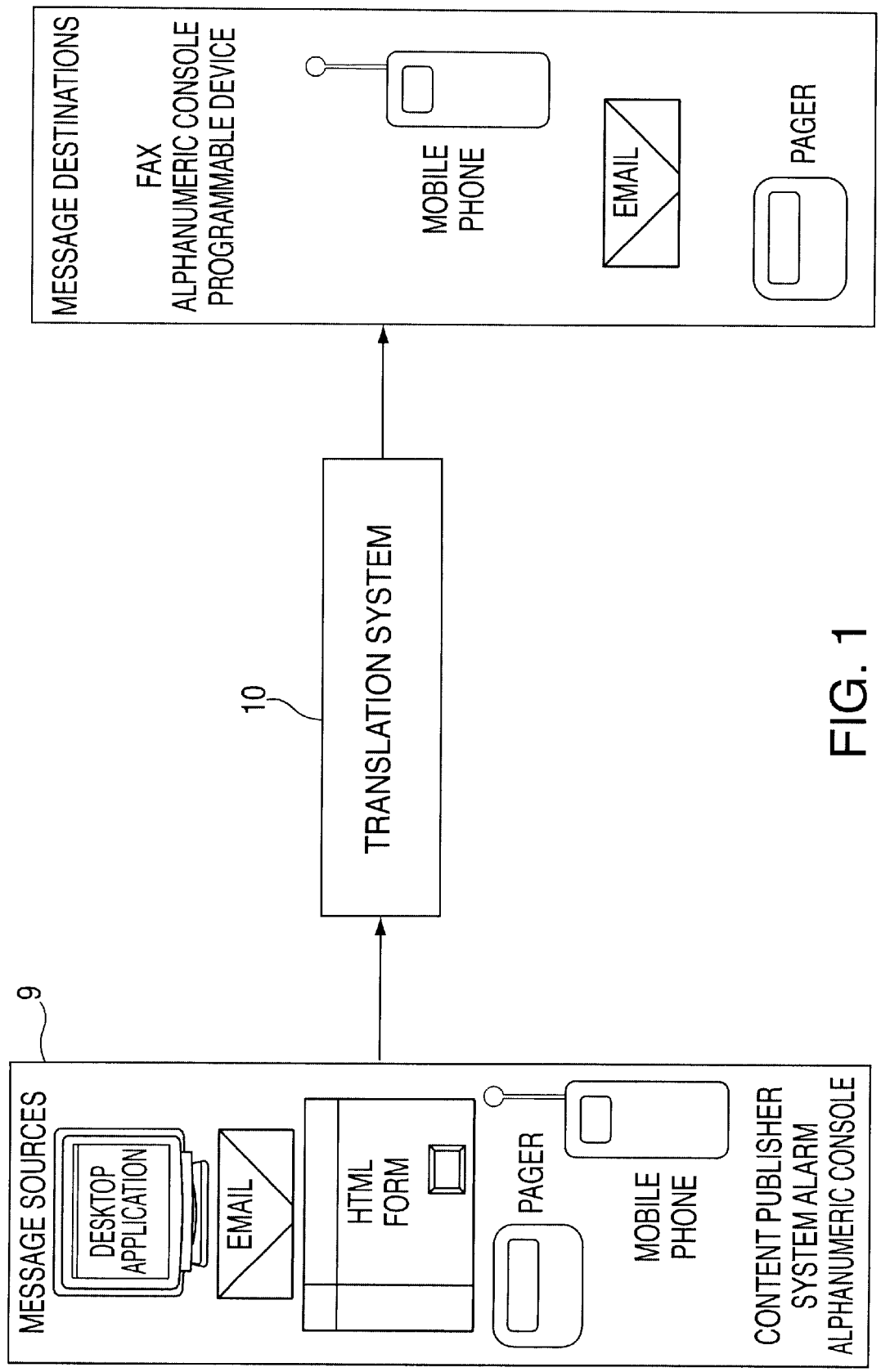
FIG. 1 is a diagrammatic view of various message sources and message destinations connected through a translation system according to the invention.
Figure 2:
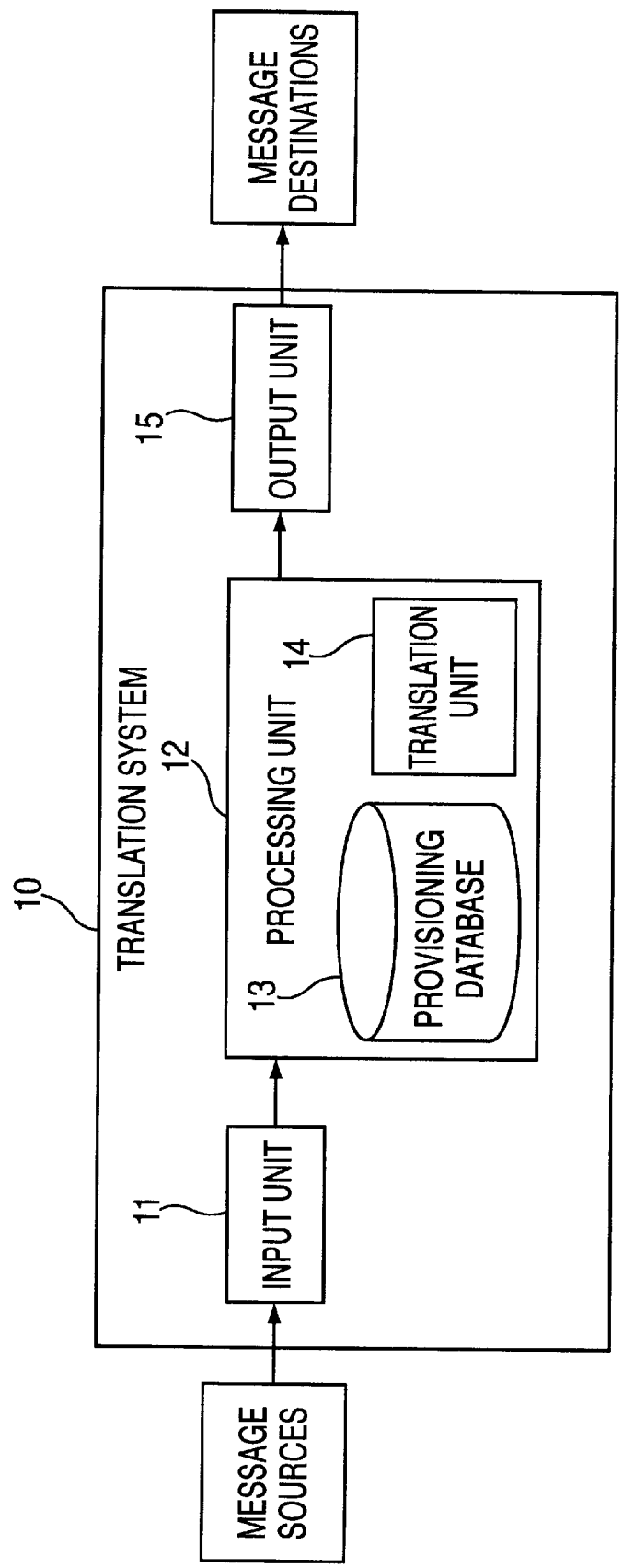
FIG. 2 is a diagrammatic view of the overall architecture of the translation system according to the invention.
Figure 3:
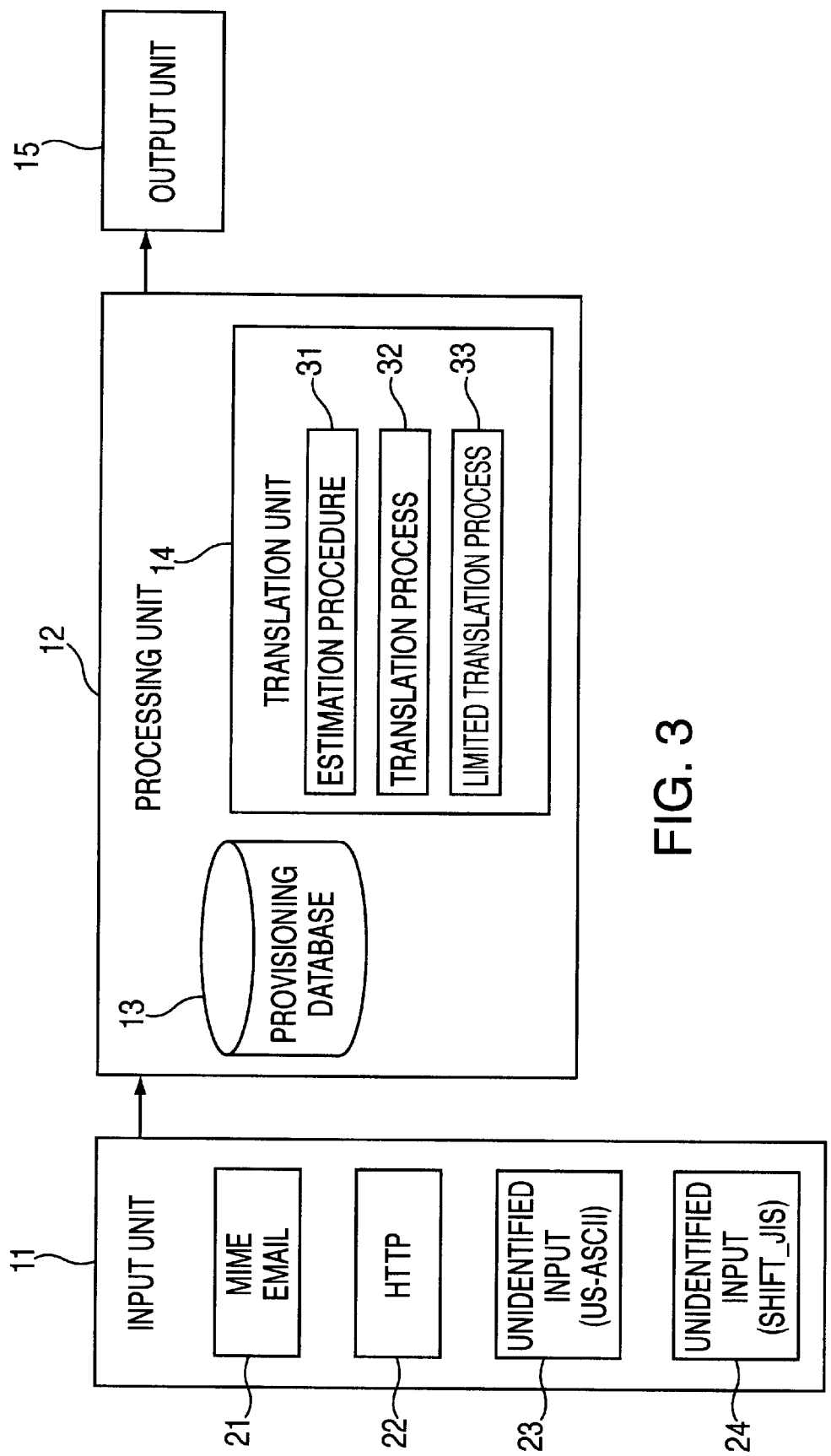
FIG. 3 is a detailed diagrammatic view of the translation system according to the invention.

Referring initially to FIG. 1 of the drawings, in which like numerals indicate like elements throughout the several views, in a preferred embodiment the translation system 10 allows for a text message to flow from sender to recipient. Modern communications utilize a high variety of character sets. Therefore, it is difficult and undesirable to require a messaging recipient to obtain conversion programs so that messages can be read correctly. In many instances, the conversion program is nonexistent. In embedded systems and end-user electronics such as an alphanumeric pager, it may be impossible to even receive some messages, much less convert them into a readable form. The translation system described herein performs the character set translation automatically, ensuring that messages can be delivered in readable form. The message is displayed on the recipient's device regardless of the character set that is supported by such device.

The system provides fully transparent translations among several character sets. The character set translation incorporates numerous translation routines placed in the path of the message. Neither sender nor recipient are aware of the existence of the system and the process does not require user intervention. The automated translation process is achieved by a complex translation system that has access to a provisioning database 13. The system uses an enhanced character mapping method.

The input unit 11 receives or retrieves message data from a message source 9. The input unit 11 identifies the source's character set used for the incoming message data. The method used for determining the input character set greatly depends upon the means by which the message data enters the system.

As an example, the MIME e-mail 21 component of input unit 11 determines the character set from the information passed via the content type header, section charset. The charset section specifies the MIME character set name. The character set name complies with RFC 1700 specifications for character names, aliases and MIME preferred character set names.

As an additional example, the HTTP 22 component of the input unit 11 uses the same definition for the character set as MIME. The character set of the message coming in using the HTTP protocol is then identified in the character set section (charset=token as per HTTP 1.1 specification).

Different means for entering the electronic text message into the system require character sets to be identified in different ways. If there is no simple way of distinguishing the source character set from the message itself, it is necessary to impose a limitation on the message entry to the system. The limitation could be in how the message enters the system. A specific method may be set for entering messages that are all in the same character set. For a different character set there is a different method of entry. This assists the automated identification of the input character set for the incoming message. As an example, the Unidentified Input-US-ASCII component 23 of the input unit 11 assumes messages coming in are in the US-ASCII character set, whereas Unidentified Input-Shift_JIS component 24 assumes the Shift_JIS character set. A similar association may be imposed between the message entry and character set on automatically retrieved messages of any sort that do not contain the character set information (i.e., plain text messages stored on an FTP server).

Once the message enters the processing unit 12 of the translation system, the translation process will begin. The first step in translation is to determine what kind of translations should be done with the source message. The provisioning database 13, which contains informtion about recipient messaging devices, is employed in this determination process. Usually, the system will have different translation requirements for different message recipients. One recipient might require the message be delivered by Email with a Russian character set, whereas another might require a message be delivered by a Chinese Traditional language-enabled pager.

While determining the properties necessary for translation, the following information is retrieved: (1) how to format the message, (2) how many and to which character sets should the source message be translated (output character set), and (3) the length limitations on the message.

When formatting, the message may require modification. Certain information may need removal and additional information may need to be added before translation can occur. This is particularly true for email based messages. Email messages may contain dam fields such as "FROM", "TO", and "SUBJECT". When email is sent to the message device that does not support these fields, the message data requires modification. It might be necessary to include the "FROM" data field in the beginning of the message to identify the source thereof.

The output character set, associated with the recipient in the provisioning database 13, is used in the process of translation. If no size limit is imposed on the length of the resulting conversion, the processing unit 12 uses an estimation procedure 31 to establish a size estimate for the final translated message. This estimate allows the processing unit 12 to allocate the proper amount of memory in advance, thereby preventing unnecessary reallocation memory which is time-costly for very large input messages. After the memory has been allocated, the translation process 32 of the translation unit 14 is invoked, resulting in character set conversion from incoming message to the allocated memory location for the outgoing message. Once the message is translated, it is forwarded to the output unit 15 which delivers the message to the recipient.

The input unit 11 is the only means by which the messages enter the system. The input unit 11 is responsible for input character set identification. During the process of messages entering the system, the input unit 11 determines the recipient of the message. While determining the recipient, if the provisioning database 13 is used, the input unit 11 is able to refuse an incoming message for nonexistent recipients or recipients not complying with security requirements. When the message is received or automatically retrieved, the input unit 11 relays it to the processing unit 12. The input unit 11 may need to generate an acknowledgement for the message entering system. In that case, the acknowledgement or negative acknowledgement may be generated based on the actual results of message translation by translation unit 12.

The processing unit 12 is responsible for transforming the input message to the output message using the rules from the provisioning database 13 and employing the translation unit 14. Each recipient has associated rules for message delivery in the provisioning database 13 based on which the processing unit 12 will then format the message. Message formatting must occur before the message is translated and the formatting might be input character set specific. Once the formatting is done, the message is translated using one or more of the functions of the translation unit 14. After the message is translated, it is delivered using the output unit 15.

The translation unit 14 is responsible for the transformation from one character set to another. For optimization of speed and efficiency, the estimation procedure 31 is included which calculates the exact length of the resulting translated message. Other routines included are the translation process 32 and the limited translation process 33 which do the translation of the entire message or until a specific length of the output is reached.

During the translation process 32 the message is converted from one character set to another. It is desirable for the translation process to be able to translate from any input character set to any output character set. A vast number of standard character sets, as well as a number of manufacture-specific character sets, are readily available and being deployed. For example, alphanumeric pagers capable of displaying characters not contained within the US-ASCII character set are widely available. In view of this high number of character sets, it is not feasible to do matrix conversion routines from each source character set to each destination character set For example, with 100 different chracter sets, the matrix conversions would require 9901 different conversion routines. There would be one identity conversion routine used for the remaining 100 character set combinations, each with the same input and output character sets. Identity conversion maps two identical character sets and preserves character identity within the conversion (e.g., creating an exact copy of the input message).

It is preferable to introduce the internal character set 55 which is used for the conversion from input to output character sets. Thus, in the example above, 100 individual conversion routines for translation are created from the input character set to the internal character set 55. Similarly, 100 conversion routines for translation from the internal character set 55 to the output character set are created. The combination of two input and output conversion routines accommodates the input to internal to output character set translation. Each of the 10,000 possible combinations are achieved by combining one of the 100 input conversion routines with one of the 100 output conversion routines.

Figure 4:
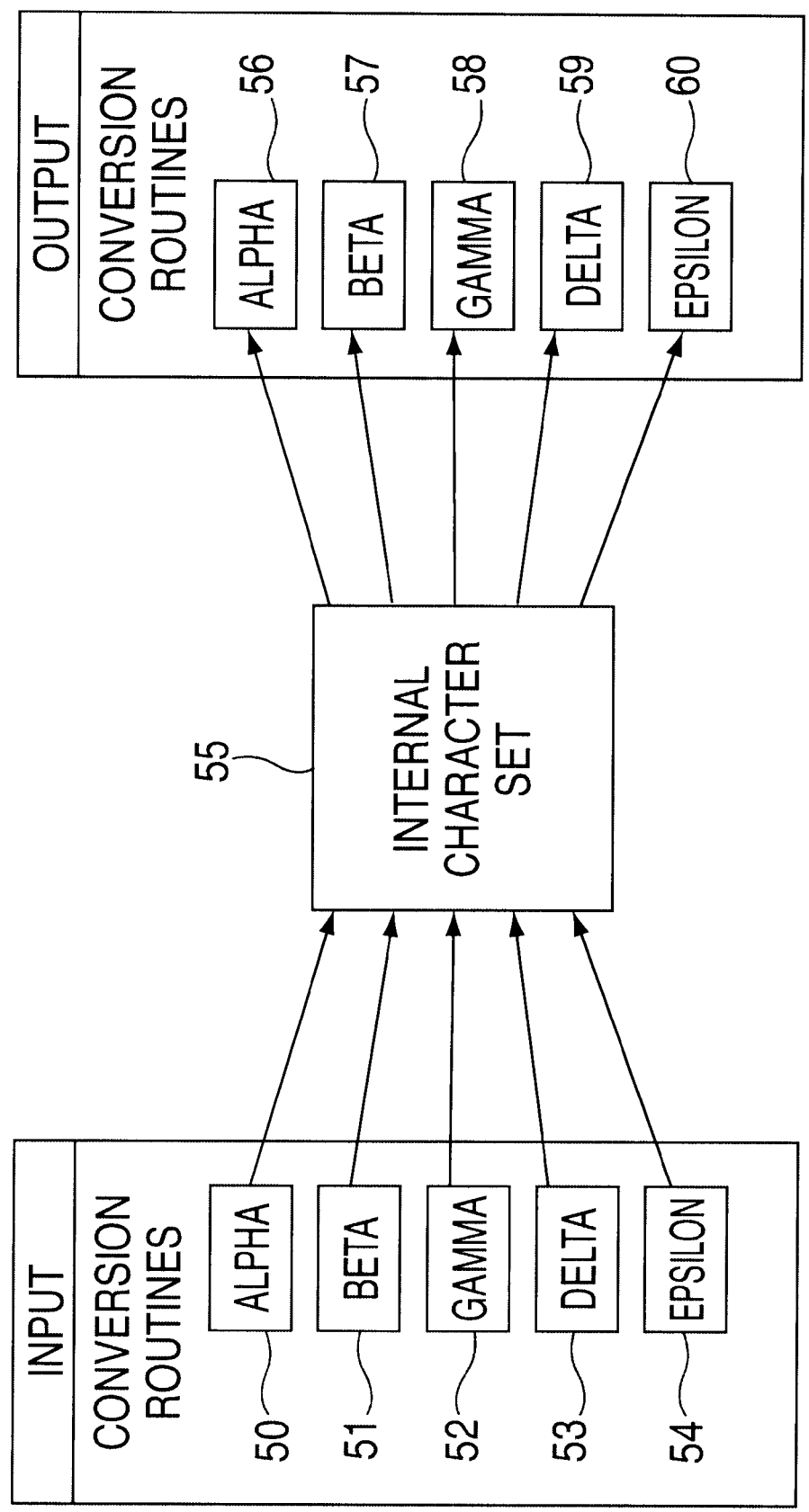
FIG. 4 is a diagrammatic view of the translation process according to the invention.

FIG. 4 shows five different character sets for the input and the output. The character sets are alpha, beta, gamma, delta and epsilon. Conversion routine 50 translates between alpha and internal character set 55. Conversion routines 51, 52, 53, and 54 translate between beta, gamma, delta and epsilon respectively and the internal character set 55. Similarly, conversion routines 56, 57, 58, 59 and 60 translate between the internal character set 55 and alpha, beta, gamma, delta and epsilon respectively. The routines are combined to allow matrix translations as shown in FIG. 5.

To translate from character set "alpha" to character set "beta", two conversion routines are chained together. First conversion routine 51 translates from alpha to internal character set 55. The second conversion routine 57 translates from internal character set 55 to beta. For conversion from alpha to gamma, translations are chained from alpha to internal character set 55 and internal character set to gamma 58.

For character sets that contain characters not specified within the internal character set 55, it might be necessary to build a specific matrix of translations. For the internal character set 55, a Unicode specification is used. Most every character set is contained within Unicode and therefore the requirement for matrix translations is minimized.

The translation process creates new data in the output character set based on the informtion stored in the input character set. Most of the characters are replaced one by one and most of the character sets do not impose any specific additional rules. The message can be built just by simply adding translated characters one after the other. Some character sets require special control characters to be inserted as identification of a character subset. In that case, the estimation routine is required to be able to take these additional control characters into account. The conversion routines for translating from or to such character sets will differ from the common conversion routines and has to be specifically designed with the exact requirements in mind. Most of the translations will consist of character set specific conversion tables and a common conversion routine. These translations will differ mainly by the content of the tables rather than by the translation algorithm.

The individual characters contained within a multitude of character sets vary greatly. Some character sets contain thousands of characters while others contain less than 100. In general, it is not possible to convert every character from one character set to another. Either the input and output character sets have different numbers of characters or there are some characters that are supported only by one of the two character sets.

In order to minimize the number of characters that cannot be translated because one of the character sets does not support them, translations employ enhanced character mapping which allows for mapping of visually or logically similar characters to enhance the amount of data that can be converted without user intervention. Furthermore, this enhanced character mapping allows for one-to-many character replacement.

Enhanced character mapping is used to enhance the number of characters that can be converted between two different character set thereby allowing for a higher success rate of the character set translations without user intervention. Enhanced character mapping extends normal character mapping which maps one-to-one from the input character set to the output character set by employing similar meaning, similar look and one-to-many character mapping.

If the character in the input character set does not have its equivalent in the output character set, but the output character set does contain a character with a similar meaning, that character is used instead. For example, digits are written differently in Thai than in English, but if the output character set contains ASCII characters only, the Thai digit can be converted to the ASCII with the knowledge that those are understood by the Thai culture. The example is illustrated in FIG. 6, whereby the system identifies the Thai character and replaces it in the communications stream with the equivalent ASCII character.

FIG. 7 illustrates the process whereby a character in the input character set does not have its equivalent in the output character set. However, the output character set contains a character with a similar look and the enhanced character mapping may exchange the input character for the similar looking output character.

FIG. 8 illustrates a one-to-many variation of the enhanced character mapping, wherein the character in the input character set does not have an equivalent in the output character set. If the output character set contains one or several characters that combined create a compound character with a similar meaning or look, the enhanced character mapping may replace the original character with several characters from the output character set.

Accordingly, it will be understood that the preferred embodiment of the present invention has been disclosed by way of example and that other modifications and alterations may occur to those skilled in the art without departing from the scope and spirit of the appended claims.

What is claimed is:

1. A method of decoding characters over a wireless network comprising the steps of:
   receiving a packet of information entered into a web browser comprising an alphanumeric message and a destination hardware specification;
   and after receiving said packet:
      identifying the operating system used to transmit said alphanumeric message;
      identifying the web browser software used to transmit said alphanumeric message;
      identifying the source language of said alphanumeric message;
      identifying a recipient wireless device corresponding to said destination hardware specification;
      referencing said operating system, web browser software, source language and recipient wireless device information against a character decoding table; and
      transmitting to said recipient wireless device the hexadecimal equivalent of the characters in said alphanumeric message.

2. The method of claim 1, further comprising the steps of substituting a near-match character where said recipient wireless device does not support the original character.

3. The method of claim 1, further comprising the steps of substituting a plurality of characters supported by said recipient wireless device to form a compound character equivalent to the character sent by said web browse and unsupported by said recipient wireless device.

4. The method of claim 1, further comprising the steps of sending a signal back to the web browser when no near-match character can be found for a recipient wireless device that does not support the original character entered in through the web browser.

5. A method of decoding characters over a wireless network comprising the steps of:
- receiving a packet of information entered into a web browser comprising an alphanumeric message and a destination hardware specification;
- and after receiving said packet:
  - identifying the operating system used to transmit said alphanumeric message;
  - identifying the web browser software used to transmit said alphanumeric message;
  - identifying the source language of said alphanumeric message;
  - identifying a recipient wireless device corresponding to said destination hardware specification;
  - referencing said operating system, web browser software, source language and recipient wireless device information against a character decoding table;
  - determining whether an exact equivalent character is supported by said recipient wireless device;
  - determining whether a visually equivalent character is supported by said recipient wireless device;
  - determining whether a compound set of equivalent characters are supported by said recipient wireless device;
  - determining whether no exact equivalent character, visually equivalent character or compound set of equivalent characters are supported by said recipient wireless device; and
- transmitting to said recipient wireless device the exact equivalent character, visually equivalent character or compound set of equivalent characters supported by said recipient wireless device and transmitting a sign to said web browser where no exact equivalent character, visually equivalent character or compound set of equivalent characters are supported by said recipient wireless device.

* * * * *